United States Patent [19]

Straub

[11] Patent Number: 4,686,077

[45] Date of Patent: Aug. 11, 1987

[54] NUCLEAR REACTOR INSTALLATION

[75] Inventor: Herman Straub, Winterthur, Switzerland

[73] Assignee: Sulzer Brothers Limited, Winterthur, Switzerland

[21] Appl. No.: 770,156

[22] Filed: Aug. 27, 1985

[30] Foreign Application Priority Data

Sep. 3, 1984 [CH] Switzerland ............... 4200/84
Dec. 1, 1984 [EP] European Pat. Off. ........ 84114642.6

[51] Int. Cl.⁴ .................................. G21C 7/16
[52] U.S. Cl. ...................... 376/230; 376/229
[58] Field of Search ................. 376/230, 229

[56] References Cited

U.S. PATENT DOCUMENTS

| | | | |
|---|---|---|---|
| 3,359,172 | 12/1967 | Olsson | 376/230 |
| 3,640,845 | 2/1972 | Ripley | 376/230 |
| 3,746,615 | 7/1973 | Rottger et al. | 376/229 |
| 3,752,736 | 8/1973 | Kornbichler et al. | 376/230 |
| 3,793,141 | 2/1974 | Ball | 376/230 |
| 3,933,581 | 1/1976 | McKeehan et al. | 376/230 |
| 4,118,275 | 10/1978 | Carleton et al. | 376/230 |
| 4,173,511 | 11/1979 | Dietrich et al. | 376/230 |

FOREIGN PATENT DOCUMENTS

| | | | |
|---|---|---|---|
| 1151607 | 7/1963 | Fed. Rep. of Germany | 376/230 |
| 2127280 | 12/1971 | Fed. Rep. of Germany | 376/230 |
| 42788 | 1/1966 | German Democratic Rep. | 376/230 |
| 1026620 | 4/1966 | United Kingdom | 376/230 |

Primary Examiner—Frederick R. Schmidt
Assistant Examiner—William E. Terrell
Attorney, Agent, or Firm—Kenyon & Kenyon

[57] ABSTRACT

The reactor has a pressure vessel receiving a coolant and a reactor core. The core has vertically movable control rods to which absorber rods are secured. Each tubular control rod extends, with the interposition of an annular gap, around an immobile guide rod which is also tubular and which is longer than the control rod. To move the control rods, coolant is supplied from the pressure vessel under pressure to the interior of the guide rods. The annular chamber communicates by way of communicating bores with the interior of the associated guide rod and, by way of at least two annular restrictions providing different restrictors with the pressure vessel interior. One restrictor is disposed at the top end of the associated control rod and the other restrictor at the bottom end thereof.

The control rods move axially upwards in response to an increasing quantity of coolant in the guide rod interiors and downwards in response to a decreasing quantity of coolant in the guide rod interiors.

20 Claims, 9 Drawing Figures

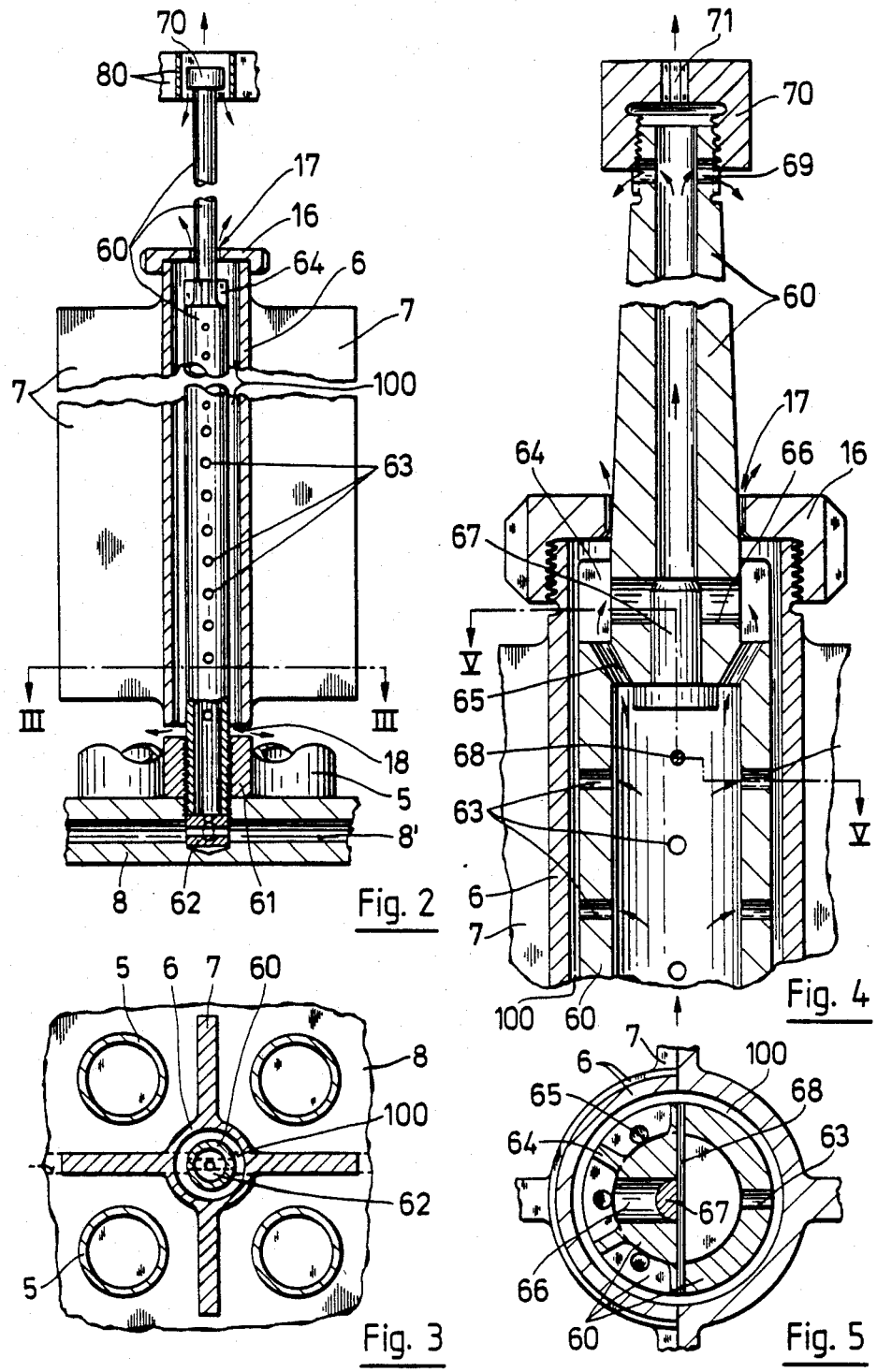

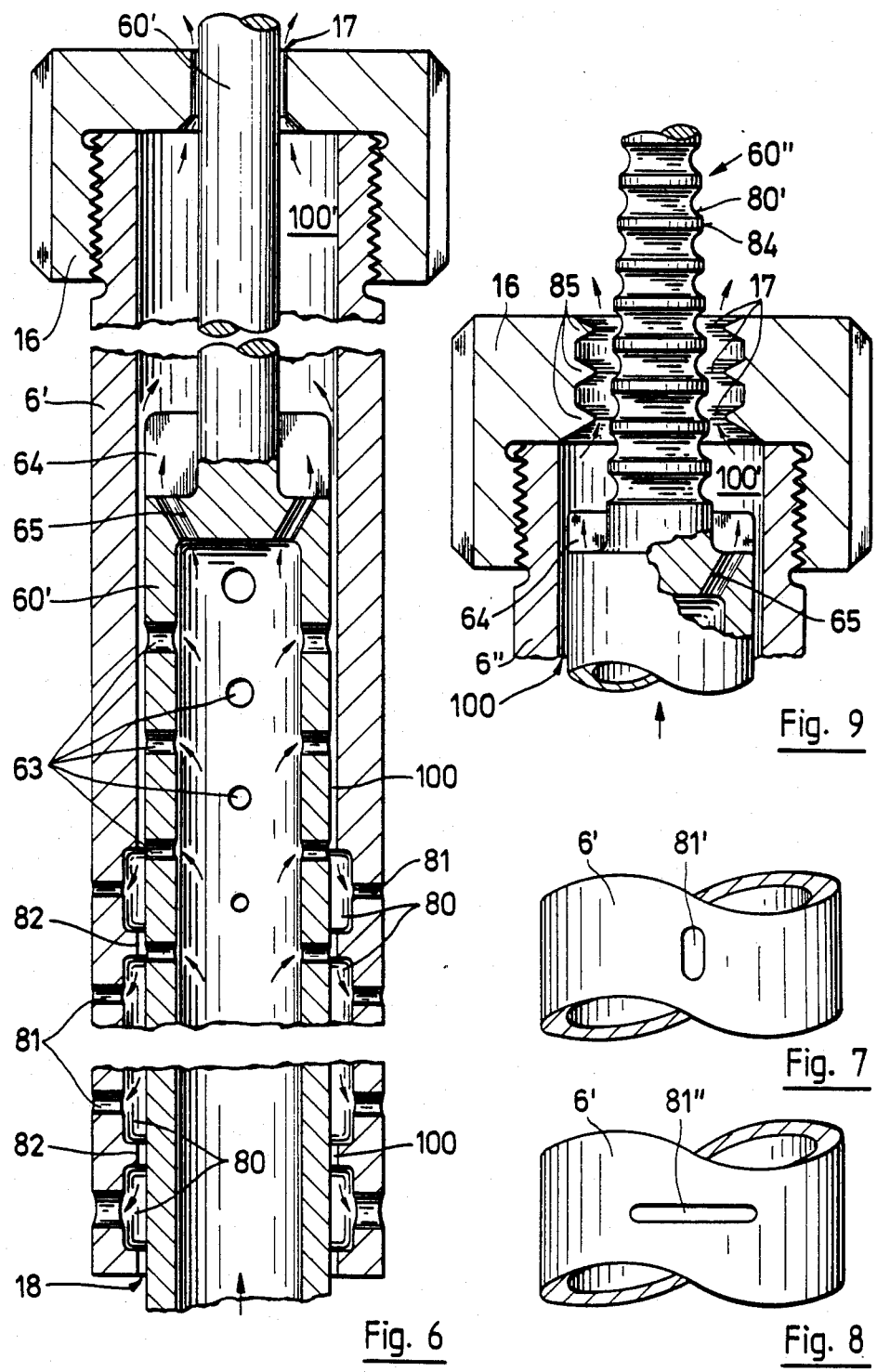

NUCLEAR REACTOR INSTALLATION

This invention relates to a nuclear reactor installation. More particularly, this invention relates to a nuclear reactor installation having movable control rods.

As is known, nuclear reactor installations have been constructed with a pressure vessel in which a reactor core is disposed, for example, for the heating of water to steam. In many cases, the reactor core has been constructed of straight vertical channel-like fuel elements which contain fissile material and vertically mobile control rods to which absorber rods are secured and positioned between the fuel elements. In addition, a conveying means has been provided to circulate a coolant from the pressure vessel under pressure through the reactor core.

In one known installation, each control rod has been reciprocated vertically by means of a dedicated hydraulic reciprocating actuator. On the whole, such installations operate reliably but suffer from two considerable disadvantages. First, the reciprocating actuators are expensive to produce and maintain since the efficiency of the actuators depends largely upon satisfactory sealing tightness between the piston and cylinder of each actuator. In view of the large number of control rods in a reactor, for example about two hundred rods for a 1300 megawatts (MW) output boiling water reactor, the significance of these costs will be apparent. A second disadvantage is that the vertical adjustment of the control rods requires an elaborate form of control.

Accordingly, it is an object of the invention to provide a nuclear reactor installation in which control rods may be driven and controlled in a relatively easy manner.

It is another object of the invention to provide a reliable manner of controlling the movement of the control rods of a nuclear reactor installation.

It is another object of the invention to provide a nuclear reactor installation with a system for controlling the movement of control rods which is simple to maintain.

Briefly, the invention is directed to a nuclear reactor installation which is comprised of a pressure vessel and a reactor core within the vessel which includes at least one fuel element and a vertically movable control rod. In accordance with the invention, a guide rod is disposed within each control rod in order to define an annular gap. In addition, the guide rod has a tubular bottom which is disposed in immobile relation to the fuel element with a plurality of bores communicating an interior of the guide rod with the annular gap. A conveying means is also provided for conveying a coolant from the pressure vessel into the interior of the guide rod in order to move the control rod relative to the guide rod and fuel element.

In addition to having the interior of the guide rod communicate with the annular gap via the communicating bores, an annular restrictor is provided at one end of the control rod to communicate the annular gap with the interior of the pressure vessel while a second annular restrictor is provided at the opposite end of the control rod to communicate the annular gap with the interior of the pressure vessel.

During operation, the control rod is able to move in one axial direction in response to an increasing quantity of coolant in the guide rod interior while moving in an opposite axial direction in response to a decreasing quantity of coolant in the guide rod interior.

The guide rod is constructed so as to be longer than the control rod. Hence, the guide rod extends upwardly through and beyond the control rod.

The installation is such that each control rod moves along the associated stationary guide rod while the coolant, which is present in the pressure vessel in any instance, is used not only to drive the control rod but also to guide the control rod without contact. An accurate relation between the variable coolant throughflow and the vertical position of a control rod can thus be provided simply by the construction of the communicating bores and restrictors, and hence the bores and restrictors can be considered to comprise means whereby such position is varied as a function of coolant throughflow. In contrast to previously known installations, the drive for a control rod requires no special accuracy in manufacture and is virtually free from wear in operation. A further advantage is in the compactness of the arrangement which provides the drive and control system for each control rod.

The installation is also constructed so that a level of liquid coolant is maintained within the pressure vessel. In this case, the conveying means has an intake disposed immediately below the coolant level to convey the coolant to the guide rods. In this embodiment, even a slight drop in coolant level in the pressure vessel renders the conveying means inoperative. Hence, the control rods can move automatically into a safety position.

In order to enable the control rods to be retained at clearly defined positions, the communicating bores in each guide rod may be distributed vertically.

Each guide rod may be constructed so that the top half is of smaller diameter than the bottom half with the communicating bores disposed in only the bottom half. In this embodiment, the control rod may have a removable guide cap on the top end which cooperates with the top half of the guide rod in order to form the upper restrictor. In this case, the restrictor provides a laminar flow of coolant. The use of a guide cap thus ensures satisfactory guidance of the control rod while also simplifying assembly and servicing.

The top half of each guide rod may also be made of a decreasing diameter in an upward direction. This provides a very fine adjustment of the position of a control rod and leads to a very advantageous control system where the communicating bores are disposed along the guide rod.

In one embodiment, each guide rod may have at least one adjustable continuous bore at a top end which communicates the interior of the guide rod with the interior of the pressure vessel. This permits a simple and accurate way of calibrating throughflow so that minor differences, for example, of weight, of the control rods can be compensated. Further, at least one restrictor may be provided for controlling a supply of coolant to the continuous bore in response to the coolant pressure. This restrictor may be disposed to open the continous bore in response to a shortfall of the coolant pressure. This feature enables the control rod to move rapidly into a bottom position which is usually a safety position.

The installation may be constructed with a core support plate which is connected to and within the pressure vessel for supporting the fuel elements while a guide lattice is secured to and within the pressure vessel for guiding the top end of each guide rod. The arrangement of the guide lattice is such as to inhibit vibrations or hunting movements of the guide rods with a consequent increase in the general safety of the installation.

Brief disturbances, such as brief variations in coolant pressure of throughflow or the formation of vapor in the coolant, could cause an alteration in the vertical position of the control rods and the rods would return only gradually to their reference or set-value position. Brief disturbances might, inter alia, impair the operation and control of the reactor. In order to ensure that the control rods return rapidly to the required position in such cases, a plurality of annular grooves are provided in each control rod in a transverse manner with each groove in facing relation to at least one bore of a respective guide rod. Consequently, the coolant issuing from the communicating bores is presented with further restrictions, on the one hand, between the outside surface of the guide rod and, on the other hand, the webs which remain between the annular grooves. In the event that the control rods become deflected because of brief disturbances, these restrictions ensure a rapid return of the control rods to their required position.

In order to enhance the above effect, each control rod may have at least one stabilizing aperture connecting at least one of the annular grooves with the interior of the pressure vessel.

In still another embodiment, the top half of each guide rod may be provided with a plurality of annular grooves while each control rod has at least one annular projection facing a respective top half of the guide rod in order to form the second annular restrictor. In this embodiment, a rapid return of the control rod to the required position can be achieved.

These and other objects and advantages of the invention will become more apparent from the following detailed description taken in conjunction with the accompanying drawings wherein:

FIG. 2 illustrates a vertical section through a control rod and an associated guide rod in accordance with the invention;

FIG. 3 illustrates a view taken on line III—III of FIG. 2;

FIG. 4 illustrates an enlarged vertical sectional view through the control rod and guide rod of FIG. 2;

FIG. 5 illustrates a view taken on line V—V of FIG. 4;

FIG. 6 illustrates a modified guide rod and control rod in accordance with the invention;

FIG. 7 illustrates a detailed view of a stabilizing aperture formed in accordance with the invention;

FIG. 8 illustrates a modified stabilizing aperture in accordance with the invention; and FIG. 9 illustrates a modified arrangement of a guide rod and control rod in accordance with the invention.

Figure 1:
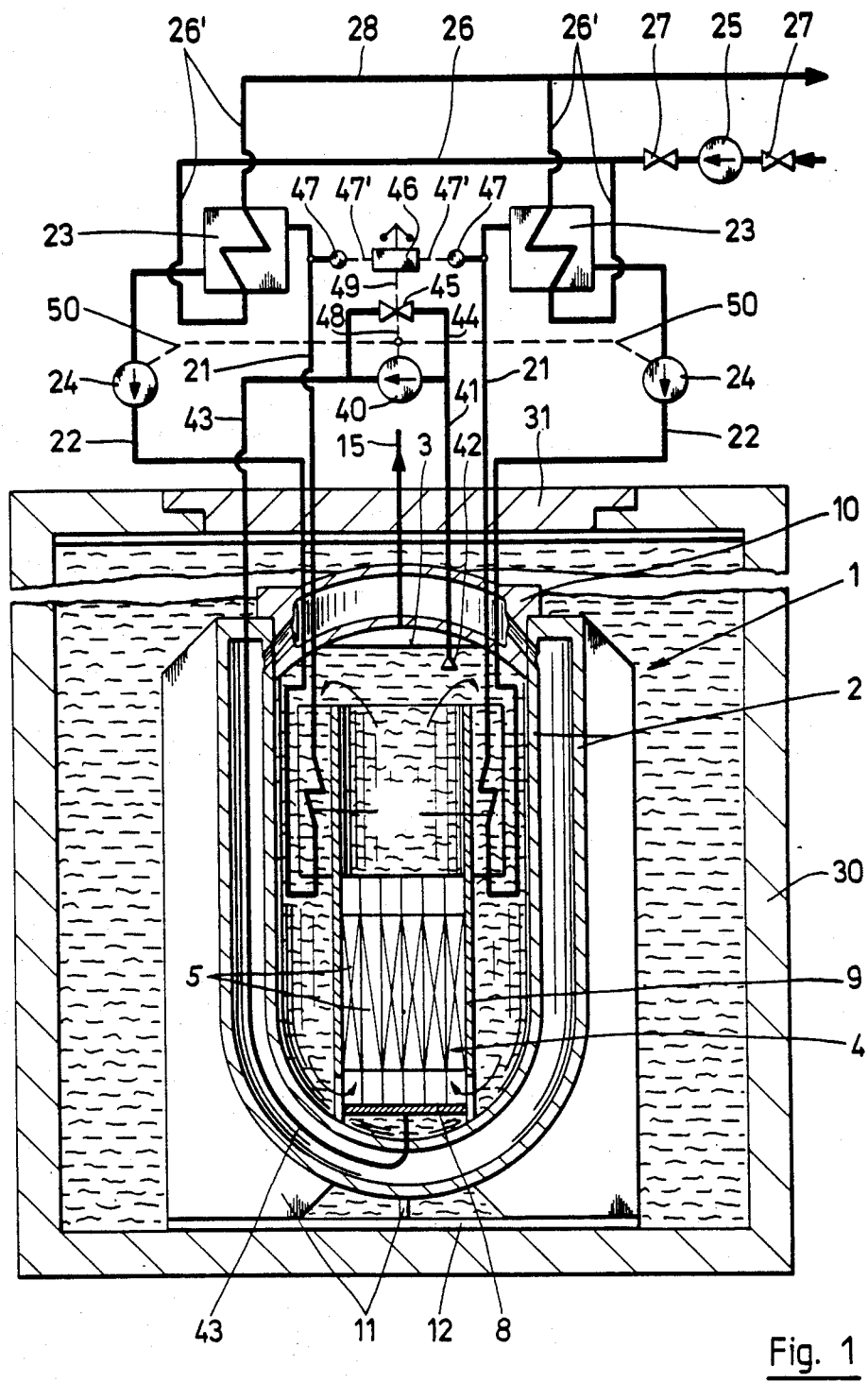
FIG. 1 illustrates a vertical diagrammatic sectional view of a nuclear reactor installation constructed in accordance with the invention.

Referring to FIG. 1, the nuclear reactor installation includes a nuclear heating reactor 1 for producing hot water used for heating in a residential area near the installation. Because of the proximity of the installation to a residential area, the reactor safety requirements are very stringent. As indicated, the reactor 1 has a double-walled pressure vessel 2 containing treated demineralized water which fills the interior of the pressure vessel 2 up to a level 3. The vessel 2 also receives a reactor core 4 which is constructed mainly of vertical channel-like cylindrical fuel elements 5 which are filled with fissile material (not shown).

Referring to FIGS. 2 and 3, the reactor core 4 also includes vertically movable control rods 6 which are located between the fuel elements 5 and to which vertical absorber rods 7 are secured between the fuel elements 5.

As indicated in FIGS. 1 and 2, the fuel elements 5 are carried by a core support plate 8 which bears on a vertical cylindrical casing 9 extending around the support plate 8. This casing 9 is open at the top and bears at the bottom on a base of the pressure vessel 2. Immediately above the plate 8, the casing 9 is formed with bores which are distributed uniformly about the circumference of the casing 9. In addition, two heat exchanger surfaces 20 extend around the top part of the casing 9.

The top of the pressure vessel 2 is closed by a double-walled cover 10 which can be opened to give access to the pressure vessel interior. The spaces or chambers between the double walls of the vessel 2 and the cover 10 are interconnected and, in known manner, are sealed off from the outside by means of sealing means (not shown).

The pressure vessel 2 has vertical ribs 11 which are connected to a bottom horizontal base plate 12. These ribs form a crushable zone in order to protect the reactor against external mechanical influences and a heat exchanger surface for emergency removal of decay heat. The base plate 12 is carried on the base of a containment 30 which protects the reactor 1 against external mechanical influence including earthquakes and aircraft crashes while also protecting the environment against radiation from the reactor. The containment is in the form of a water-filled pool which has a top cover 31. The pool water serves as an additional radiation protection for the environment even when the cover 31 is open while also acting as a heat sink for emergency removal of afterheat from the reactor 1. In such an emergency, the chambers in the double walls of the pressure vessel 2 and cover 10 which are normally filled with air, a good heat insulant, are flooded with pool water which is a good heat conductor via suitable means (not shown) so that the heat from the inside of the pressure vessel 2 is removed to the pool water with the further assistance of the ribs 11.

Means are provided for circulating water through the heat exchanger surfaces 20 as a secondary coolant. This means includes a hot line 21 and a cold line 22 connected at opposite ends of each heat exchanger surface 20, which lines extend through the covers 10, 31 to a secondary heat exchanger 23. As indicated, each cold line 22 includes a pump 24 for pumping the water into the respective heat exchanger surface 20. Another pump 25 is provided in a feed line 26 for delivering heating water. As indicated, the feed line 26 has a pair of valves 27 located before and after the pump 25, respectively. In addition, a pair of parallel branch lines 26' diverge, one through each of the secondary heat exchangers 23, to communicate with a heating water line 28 which conveys heat for heating to a load (not shown).

A conveying means is also provided for conveying coolant from within the pressure vessel 2 through the reactor core 4. This conveying means includes a control pump 40 which is connected on the intake side by way of an intake line 41 to an intake in the form of a venturi inlet 42 disposed in the pressure vessel 2 immediately below the coolant level 3. The pump 40 delivers to a control line 43 which extends through the cover 31 and vessel 2 and is connected to a horizontal system of bores in the plate 8 (see FIG. 2). The pump 40 is speed controlled for pumping coolant to the plate 8 and is connected in parallel with a bypass line 44. As indicated in FIG. 1, the intake and delivery sides of the pump 40 are interconnected by way of the bypass line 44 while a control valve 45 is disposed in the bypass line 44. In addition, a controller 46 is connected by means of signal lines 47' to temperature detectors 47 disposed one in each of the hot lines 21 and acts in known manner to control, by way of signal lines 48, 49 and in accordance with the cooling water temperature measured in the hot lines 21, the speed of the control pump 40 (coarse adjustment) or the opening of the control valve 45 (fine adjustment).

The control pump 40 is so connected by way of signal lines 50 to the pumps 24 in the lines 21 in known manner that the pump 40 can operate only when at least one of the two pumps 24 is operating.

A degassing line 15 which extends through the cover 10 and the cover 31 connects the top zone of the vessel 2 to atmosphere, if required by way of a radioactive gas cleaning and decontamination facility (not shown).

Lifting tackle which is known but not shown serves for manipulation of the moving components of the installation, for example, in connection with the opening and closing of the cover 10 and cover 31 and the loading and unloading of the fuel elements 5 in assembly and inspection work.

The installation shown in FIG. 1 operates as follows:

In normal operation, the control rods 6 and the absorber rods 7 connected thereto are disposed at a predetermined position above the plate 8, such position depending upon the pressure or upon the throughflow of the water which the pump 40 intakes through the venturi inlet 42 and intake line 41 from inside the pressure vessel 2 and delivers through line 43 to the plate 8. A proportion of the water, corresponding to the setting of the valve 45, returns through the bypass line 44 from the delivery side of the pump 40 to the intake side to provide fine control of the water throughflow in the line 43. Coarse adjustment of the water throughflow in the line 43 is provided by adjustment of the speed of the pump 40.

The nuclear reaction between the fuel elements 5 occurs mainly in the core zone left free by the absorber rods 7. The resulting heat is transmitted to the water in the pressure vessel 2. The heated water rises in the cylindrical casing 9, reverses to flow downwardly at the top end thereof and yields heat to the heat exchanger surfaces 20. The water continues to flow down and returns through the casing bores above the plate 8 into the core 4 where the cycle recommences.

The secondary cooling water is heated in the surfaces 20 and conveys the heat taken up along the hot lines 21 to the secondary heat exchangers 23, where the heat is yielded again and the cooled cooling water returns through lines 22 and pumps 24 to the surfaces 20. The pump 25 delivers heating water through the feed line 26 and branch lines 26' to the secondary heat exchangers 23, in which the water is heated, and to the heating water line 28, through which the heated heating water goes to loads (not shown). In certain circumstances, the heating water may advantageously be circulated in a closed circuit. The valves 27 are normally open and are closed only for assembly and repair work on the additional pump 25.

Provided that the secondary cooling water temperature remains stable, the controller 46 maintains the speed of the control pump 40 and the flow cross-section of the valve 45 constant. If, for example, the cooling water temperature rises as indicated by temperature sensors 47 and transmitted by way of signal lines 47' to controller 46, the latter acts by way of the signal line 49 to open the control valve 45 and thus reduce the cooling water throughflow through the control line 43. Consequently, and in a manner to be described hereinafter, the control rods 6 and absorber rods 7 drop so that less heat is produced in the reactor core 4. If the set-value or reference temperature of the cooling water cannot be maintained even with the valve 45 fully open, the controller 46 acts by way of the signal line 48 to reduce the speed of the pump 40. In the event of the cooling water temperature in the hot line 21 decreasing, the controller 46 reacts oppositely to what has just been described.

The cooling water temperature set value is adjusted in dependence upon the required temperature and throughflow of heating water in the heating line 28.

In the event of the coolant level 3 in the vessel 2 dropping, vapor bubbles form in the venturi inlet 42 so that the pump 40 ceases to deliver cooling water. As a result, in a manner to be described hereinafter, the control rods 6 move automatically by their own weight into their safety position and interrupt reactor operation. Gases are, of course, evolved by radiation inside the pressure vessel 2 and are removed conventionally through the vent line 15.

Referring to FIGS. 2-5, each control rod 6 takes the form of a vertical cylindrical tube provided with four radial absorber rods 7 disposed uniformly around the circumference of the control rod 6. Each control rod 6 extends coaxially around a tubular guide rod 60 with the interposition of an annular gap or chamber 100 which extends over the whole length of the control rod 6. The guide rods 60 are about twice as long as the control rods 6 and have smaller inner and outer diameters in their top half than in their bottom half.

Each guide rod 60 has an external screwthread near the bottom end to enable threading, into a sleeve 61 and a bore in the plate 8 to which the sleeve 61 is connected. Each bore extends vertically as far as a horizontal bore 8' inside the plate 8. A plug 62 engaged in the vertical bore serves as an abutment for the guide rod 60 and is pierced coaxially to the horizontal bore 8' completely, and coaxially to the vertical bore at the top half-way. Thus, the interior of the guide rod 6 communicates with the horizontal bore 8'. All the horizontal bores 8' are interconnected and combined to form a system which is connected to the control line 43 (see FIG. 1).

As FIG. 3 shows, each absorber rod 7 separates two adjacent fuel elements 5. The absorber rods 7 are made of a material which absorbs the atomic particles, neutrons in the present example, responsible for producing the nuclear reaction.

Each guide rod 60 is formed in the bottom half with horizontal communicating bores 63 which are disposed in pairs one above another at a 90° offset from one another and which connect the interior of the guide rod 60 to the gap 100. The distance between two consecutive pairs of bores 63 decreases with increasing height. In the transition zone between the large and small diameter halves of the rod 60, six vertical and radial strengthening ribs 64 are distributed uniformly over the guide rod circumference. These ribs 64 serve as a means for the engagement of a tool for screwing the guide rod 60 in and out, the guide rod 60 being adapted to be fitted and demounted independently of the associated control rod 6. Inclined communicating bores 65 are disposed between every two adjacent ribs 64 and, starting from the inside of the bottom half of the guide rods 60, extend upwardly. Immediately above, two additional horizontal and relatively large communicating bores 66 connect the interior of the top half of the guide rod 60 in a zone between two reinforcing ribs 64 to the gap 100.

Referring to FIGS. 4 and 5, a vertical cylindrical valve rod 67 which also has a cylindrical head is slidingly engaged from below in a bore at the top end of the bottom half of the guide rod 60 to act as a restrictor. When in the top position, the cylindrical head abuts a shoulder in the inside of the guide rod 60 to provide considerable restriction of the communicating bores 66, whereas when the valve rod 67 is in the bottom position, in engagement with a horizontal retaining pin 68 pushed through the guide rod 60, the bores 66 are opened to the vertical continuous bore.

The top end of each control rod 6 has a screwed-on externally hexagonal guide cap 16 which co-operates with the top half of the guide rod 60 to form a restrictor 17. This restrictor 17 provides substantially laminar flow conditions and is much smaller than a bottom restrictor 18 at the other end of the control rod 6 in every position of this rod 6. The top half of the guide rod 60 has the shape of a cone which narrows slightly upwardly so that the restricting cross-section of the top restrictor 17 becomes greater as the control rod 6 rises.

Referring to FIG. 4, an adjusting cap 70 is screwed on to the top of the top end of each guide rod 60 and is formed with a vertical continuously hexagonal central aperture or opening 71. The opening 71 serves as a connection between the inside of the guide rod 60 and the inside of the pressure vessel 2 and as a means for engaging a tool to turn the cap 70. Two oppositely disposed horizontal through bores 69 which extend from the vertical bore in the top half of the guide rod 60 to the exterior, i.e. into the interior of the pressure vessel 2 gradually become covered as the cap 70 is turned downwardly.

Referring to FIG. 2, a guide lattice 80 is rigidly connected to the casing 9 to support the guide rods 60 against vibration and/or hunting.

The arrangement shown in FIGS. 2-5 operates as follows:

When the control pump 40 is running at a constant speed and the flow cross-section of the valve 45 remains constant, the throughflow through the control line 43 remains constant. Consequently, a constant quantity of coolant flows through the bores 8' of the plate 8, the coolant passing through the bores in the plug 62 into the interior of the guide rod 60 and through the communicating bores 63,65 into the annular gap or chamber 100. Some of the coolant flows therefrom into the inside of the pressure vessel 2 by way of the communicating bores 66 restricted by the valve rod 67 (see FIG. 4), the central aperture 71 and the through bores 69. Another proportion of coolant issues from the space or chamer 100 through the top restrictor 17 and a third proportion of the quantity of coolant flows through the bottom restrictor 18 into the interior of the pressure vessel 2. Because of its shaping, the guide cap 16 ensures the maintenance of a substantially laminar uniformly distributed flow through the top restrictor 17, thus ensuring reliable centering of the control rod 6.

When the speed of the pump 40 rises or the flow cross-section of the valve 45 decreases, the throughflow through the route described and, therefore, the pressure upstream of the guide cap 16 increase. Consequently, the cap 16, control rod 6 and absorber rods 7 rise. The bottom communicating bores 63 therefore cease to be covered by the control rod 6 and the coolant flowing through them flows directly—i.e., not through the annular chamber 100—into the pressure vessel interior. Since this coolant does not have to flow through the bottom restrictor 18, the coolant can issue from the guide rod 60 more rapidly. The pressure below the guide cap 16 therefore decreases increasingly until a state of equilibrium is reached between the forces acting on the control rod 6 and the absorber rods 7 and the movement stops.

When the pressure below the guide cap 16 drops in response to a speed decrease of the pump 40 and/or an increase in the flow cross-section of the valve 45, the control rod 6 and the absorber rods 7 drop until a new equilibrium condition has been reached. In the event of an abrupt interruption of cooling water supply to the horizontal bores 8' of the plate 8, the pressure below the cap 16 drops very rapidly and, therefore, so does the pressure below the valve rod 67 (FIG. 4), so that the rod 67 drops by gravity onto the retaining pin 68 and opens the full cross-sections of the bores 66. The low-pressure cooling water can then flow without restriction through the bores 66, the inside of the top half of the guide rod 60, the bores 69 and the central aperture 71 into the inside of the pressure vessel 2. The control rod 6 and the absorber rods 7 can then drop down into their safety position.

Due to the vertical distribution of the communicating bores 63, each passage of the bottom edge of a control rod 6 past a bore 63 produces a relatively large variation in the quantity of the cooling water circulating through the guide rod 60. The result is that the control rod 6 takes up a number of preferred heights which are consecutive in stepped fashion and which greatly simplify the coarse adjustment of the control. The fact that the spacing between the bores 63 decreases with increasing height allows for control requirements on high-load operation. Also, because of the conical shape of the top half of the guide rod 60, the gradual variation in the top restrictor 17 in response to variations in control rod position serves for fine adjustment of the control.

Because each control rod 6 and the associated absorber rods 7 may vary in shape and weight because of unavoidable manufacturing tolerances, the adjusting caps 70 can provide a further advantage. That is, each cap 70 can be turned to adjust the flow cross-sections of the bores 69 and thus provide individual compensation of the variations between the control rods 6, so that the control rods 6 are at substantially the same height in any operative state of the installation.

The guide lattice 80 obviates vibrations and/or hunting movements of the guide rods 60 without impairment of the adjustability of the caps 70 and therefor contributes substantially to the general safety of the installation. Accidental displacements of the caps 70 are therefore prevented as well.

As an alternative to the feature shown, for example, the coolant can be introduced at the top end of a guide rod 60 and the descent of the control rod into a safety position can be spring-assisted.

Referring to FIG. 6, the guide rod 60' may be constructed to be tubular only in the bottom half, the top half being cylindrical and of smaller diameter than the outer diameter of the bottom half. As above, six strengthening ribs 64 are disposed at the transition between the larger diameter and the small diameter halves and the communicating bores 65 extend to between the ribs 64.

Unlike the embodiment of FIG. 2, the bores 63 are disposed only in the top half of the bottom half of the guide rods 60', the diameter of the various bores 63 increasing with increasing height. The vertical separation between the bores 63 is constant. The bores 65 connect the inside of the guide rod 60' to a widened part 100' of the annular chamber 100 which part extends between the cap 16 and the ribs 64. The inside surface of the control rod 6' is formed with horizontal or transverse annular grooves 80 whose height is equal to the axial distance between the top boundary of a bore 63 and the bottom boundary of the adjacent bore 63 disposed on the same generatrix of the guide rod 60'. In addition, two stabilizing apertures 81, in the form of horizontal cylindrical bores, are disposed about halfway up the height of each groove 80 and connect the chamber 100 to the inside of the pressure vessel, the diameter of the apertures 81 decreasing upwardly. The apertures 81 are disposed in the bottom half of the control rod 6'.

The axial separation between two adjacent grooves 80 is very small. Consequently, annular separating webs 82 remain between the grooves 80, the axial width of the webs 82 being approximately equal to the greatest diameter of the bores 63.

The position of the control rod 6' is stabilized as follows:

Assuming a constant pressure or constant delivery of cooling water supplied to the interior of the guide rod 60', the control rod 6'0 takes up a particular position, the cooling water flowing from the inside of the guide rod 60' through the bores 63, 65 into the chamber 100 or 100' and into the pressure vessel interior. The quantity of cooling water conveyed into the chambers 100, 100' issues therefrom by way of the bottom restrictor 18, the top restrictor 17 and the stabilizing bores or apertures 81. Because of the pressure distribution in the control rod 6', at least one web 82 restricts the top zone of a bore 63 so that some of the cooling water, instead of flowing through the bottom restrictor 18 and the bores 81, flows to the bores 65 or to the top restrictor 17 and to bores 63 which may not have been covered by the control rod 6'.

Provided that cooling water pressure and delivery remain constant, there is equilibrium between the weight of the control rod 6' and of the absorber rods (not shown) secured thereto, the hydrodynamic forces which the cooling water flowing in the pressure vessel applies to the control rod and absorber rods, and the forces arising because of the pressure differences inside and outside the control rod 6'. Any vertical shift of the control rod 6' results in a change in cooling water throughput through the restrictor bores 63 and, therefore, a variation in the distribution of cooling water flow in the guide rod 60' and annular chambers 100, 100'. The pressure difference operative on the control rod 6' therefore changes substantially. The stabilizing bores 81 have a multiplier effect on these pressure differences since in the event of a change in the restriction provided by the bores 63, the resulting change in the quantity of cooling water flowing through the stabilizing bores 81 is several times greater than the corresponding change of the quantity of cooling water flowing just through the bottom restrictor 18.

For example, in response to an upwards movement of the control rod 6', the restrictive effect of the webs 82 on the bores 63 decreases. Thus, more cooling water issues from the guide rod 60' and the pressure below the cap 16 drops. The control rod 6' then drops down back into its original position. However, in the event of a downwards movement of the rod 6', the webs 82 provide increased restriction of the bores 63 and more cooling water is retained in the guide rod 60', so that the pressure below the cap 16 rises and pushes the control rod 6' up back into its original position.

Those positions of the control rod 6' in which the bores 63 are disposed exactly opposite bores 81 are very stable since, in this case, small displacements produce relatively substantial restrictions of the bores 63.

The flow cross-section of the bores 63, 81 can be considerably increased if required if more than two such bores are disposed at one vertical position. Increased flow-cross-sections can also be provided by special shaping of the bores 63, 81, as illustrated for a stabilizing bore in FIG. 7, in the form of an axial slot 81' extending lengthwise of the control rod 6', and in FIG. 8, the slot 81'' being disposed transversely to the longitudinal direction of the control rod 6'.

Referring to FIG. 9, the guide rod 60'' may have a tubular cylindrical bottom half, as in FIG. 6, but a slightly conical top half which narrows upwardly. The maximum diameter of the top half of the guide rod 60'' is less than the outer diameter of the bottom half. The six inclined communicating bores 65 which extend between the ribs 64 connect the guide rod interior to the annular chambers 100, 100', the bottom half of the guide rod being devoid of communicating bores. The top conical half of the guide rod 60'' is formed with uniformly distributed horizontal annular grooves 80' separated vertically from one another by conical webs 84.

In contrast to the control rod 6' of FIG. 6, the control rod 6'' is devoid of stabilizing bores. Instead, the guide cap 16 screwed onto the top end has three annular horizontal projections 85 which extend towards the conical part of the guide rod 60'' and which cooperate therewith to form three annular top restrictors 17. Disposed at the bottom end of the control rod 6'' is the annular bottom restrictor (not shown) which is identical to the bottom restrictor 18 of FIG. 6. The three projections 85 are tangential to a hypothetical conical surface extending parallel to the conical top half of the guide rod 60''; the projections are equidistant from one another as are the top edges of two adjacent webs 84.

The restrictors 17 stabilize the vertical position of the control rods 6'' as follows:

The position which is shown in FIG. 9 and in which the projections 85 of the control rods project above the top edges of the adjacent webs 84, is a preferred stable position. A very reduced upwards movement of the rod 6'' caused by a brief increase in cooling water pressure leads to a substantial increase in the flow cross-section of the restrictors, so that the pressure drops immediately and the control rod drops back into its stable position. Consequently, for a particular constant pressure, a position is always taken up in which the projections 85 are disposed a little above the top edge of the webs 84. A single projection 85 can provide the same effect as the three projections 85 of FIG. 9; however, the provision of a number of projections 85 ensures that the installation will continue to operate satisfactorily even should two of the projections be damaged. As an alternative to the example shown in FIG. 9, the projections can be disposed in the bottom restrictor, in which event the bottom half of the guide rod 60' must be formed with the annular grooves. The webs 84 can each be reduced just to an edge.

The cross-section of the grooves 80, 80' can have a shape other than the shapes illustrated and can, for example, extend helically.

Also, it may be required to provide position sensors indicating the vertical position of the control rods or absorber rods to observers outside the pressure vessels 2. Sensors of this kind can take the form, for instance, of sonar devices which ascertain the vertical position of the control rods from the core support plate 8 and provide information outside by way of radio. The sensors can also be magnetic sensors connected by way of signal lines to a control room of the installation.

For the sake of simplicity, only the effect of the temperature on the controller 46 was shown in the embodiment described. Conventionally, at least the pressure in the pressure vessel 2 and the neutron radiation in the core, as measured by a neutron flux meter, act on the controller 46.

The invention thus provides a nuclear reactor installation with a relatively simple means for moving the control rods of a reactor core.

Further, the invention provides a relatively simple guide rod arrangement for a movable control rod which is relatively easy to service and maintain.

What is claimed is:

1. A nuclear reactor installation comprising
a pressure vessel;
a reactor core within said vessel, said core including straight vertical channel-like fuel elements for containing fissile material, vertically movable control rods between said fuel elements and absorber rods secured to said control rods between said fuel elements;
a plurality of guide rods, each guide rod being disposed within and extending from a respective control rod to define an annular gap therebetween and having a tubular bottom half disposed in immobile relation to said fuel elements, each guide rod having a plurality of bores communicating an interior of said guide rod with said annular gap;
conveying means for conveying a coolant from said pressure vessel into said interior of each said guide rod to move said control rods;
a first annular restrictor at one end of each said control rod communicating said annular gap with the interior of said pressure vessel; and
a second annular restrictor at an opposite end of each said control rod communicating said annular gap with the interior of said pressure vessel;
said communicating bores and said restrictors being sized whereby said control rods move in one axial direction in response to an increasing quantity of coolant flow into said guide rod interiors and in an opposite axial direction in response to a decreasing quantity of coolant flow into said guide rod interiors.

2. A nuclear reactor installation as set forth in claim 1 which further comprises a level of liquid coolant within said pressure vessel and wherein said conveying means has an intake disposed immediately below said level for conveying the coolant to said guide rods.

3. A nuclear reactor installation as set forth in claim 2 wherein said conveying means includes at least one speed-controlled pump for pumping coolant to said guide rods, a bypass line connected in parallel with said pump and a variable restrictor in said bypass line to control a flow of coolant therethrough.

4. A nuclear reactor installation as set forth in claim 1 wherein said communicating bores are distributed vertically along each said guide rod.

5. A nuclear reactor installation as set forth in claim 1 wherein each guide rod has a top half of smaller diameter than a bottom half thereof with said bores disposed in said bottom half and which further comprises a removable guide cap on a top end of each control rod to form said second restrictor with said top half for a laminar flow of coolant therethrough.

6. A nuclear reactor installation as set forth in claim 5 wherein said top half of each guide rod is of decreasing diameter in an upward direction.

7. A nuclear reactor installation as set forth in claim 5 wherein each guide rod has at least one adjustable continuous bore at a top end communicating said interior of said guide rod with the interior of said pressure vessel.

8. A nuclear reactor installation as set forth in claim 7 which further comprises at least one restrictor for controlling a supply of coolant to said continuous bore in each guide rod in response to coolant pressure whereby said restrictor opens said continuous bore in response to a shortfall of the coolant pressure.

9. A nuclear reactor installation as set forth in claim 5 which further comprises a core support plate connected to and within said pressure vessel for supporting said fuel elements and a guide lattice secured to and within said pressure vessel for guiding said top end of each guide rod.

10. A nuclear reactor installation as set forth in claim 1 wherein said communicating bores are distributed vertically along each said guide rod on an upwardly decreasing spacing.

11. A nuclear reactor installation as set forth in claim 1 wherein said communicating bores are distributed vertically along each said guide rod and which further comprises a plurality of grooves in each control rod disposed transversely thereof and with each groove in facing relation to at least one bore of a respective guide rod.

12. A nuclear reactor installation as set forth in claim 11 wherein each control rod has at least one stabilizing aperture connecting at least one of said grooves with the interior of said pressure vessel.

13. A nuclear reactor installation as set forth in claim 12 wherein each stabilizing aperture is a slot extending lengthwise of said respective control rod.

14. A nuclear reactor installation as set forth in claim 12 wherein each stabilizing aperture is a slot extending transversely of said respective control rod.

15. A nuclear reactor installation as set forth in claim 12 wherein each control rod has a stabilizing aperture connecting each of said grooves with the interior of said pressure vessel, each said aperture being of decreasing flow cross-section in an upward direction.

16. A nuclear reactor installation as set forth in claim 11 wherein said communicating bores are of decreasing flow cross-section in an upward direction.

17. A nuclear reactor installation as set forth in claim 1 wherein a top half of each guide rod has a plurality of annular grooves and each control rod has at least one annular projection facing a respective top half of a guide rod to form said second annular restrictor.

18. A nuclear reactor installation comprising
a pressure vessel;

a reactor core within said vessel having at least one fuel element and a vertically movable control rod;

a guide rod disposed within said control rod to define an annular gap therewith and having a tubular bottom disposed in immobile relation to said fuel element with a plurality of bores communicating an interior of said guide rod with said annular gap;

conveying means for conveying a coolant from said pressure vessel into said interior of said guide rod to move said control rod relative to said guide rod and said fuel element;

a first annular restrictor at one end of said control rod communication said annular gap with the interior of said pressure vessel; and a second annular restrictor at an opposite end of said control rod communicating said annular gap with the interior of said pressure vessel, said bores and said restrictors comprising means whereby said control rod moves in one axial direction in response to an increasing quantity of coolant flow into said guide rod interior and in an opposite axial direction in response to a decreasing quantity of coolant flow into said guide rod interior.

19. A nuclear reactor installation as set forth in claim 18 wherein said guide rod includes a bore extending through a top half thereof communicating said annular gap with the interior of said pressure vessel and which further comprises an adjusting cap on said guide rod for adjusting the flow cross-section of said bore in said top half.

20. A nuclear reactor installation as set forth in claim 18 wherein said restrictors are of different restrictions.

* * * * *

UNITED STATES PATENT AND TRADEMARK OFFICE
CERTIFICATE OF CORRECTION

PATENT NO. : 4,686,077

DATED : August 11, 1987

INVENTOR(S) : HERMAN STRAUB

It is certified that error appears in the above-identified patent and that said Letters Patent is hereby corrected as shown below:

```
Column 3, line 4  "pressure of" should be -pressure or-
Column 7, line 59 "chamer" should be "chamber-
Column 8, line 57 "therefor" should be -therefore-
Column 8, line 59 "Accidential" should be -Accidental-
Column 9, line 34 "6'0" should be -6'-
Column 13, line 13 "communication" should be -communicating-
```

Signed and Sealed this

Sixteenth Day of February, 1988

Attest:

DONALD J. QUIGG

Attesting Officer

Commissioner of Patents and Trademarks